US008272034B2

(12) United States Patent
Bender

(10) Patent No.: US 8,272,034 B2
(45) Date of Patent: Sep. 18, 2012

(54) METHODS AND APPARATUS FOR MAINTAINING PERMISSIONS FOR CLIENT/SERVER PROCESSING IN A COMMUNICATION DEVICE

(75) Inventor: Christopher Lyle Bender, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1062 days.

(21) Appl. No.: 12/196,900

(22) Filed: Aug. 22, 2008

(65) Prior Publication Data

US 2010/0050187 A1 Feb. 25, 2010

(51) Int. Cl.
*G06F 17/30* (2006.01)
*G06F 15/16* (2006.01)
(52) U.S. Cl. .............. 726/2; 726/4; 709/228; 709/229
(58) Field of Classification Search .............. 719/318, 719/321; 709/203, 228, 229; 726/2, 4, 17, 726/21, 27; 380/270
See application file for complete search history.

(56) References Cited

U.S. PATENT DOCUMENTS

| | | | |
|---|---|---|---|
| 6,044,466 A | 3/2000 | Anand et al. | |
| 6,553,492 B1 | 4/2003 | Hosoe | |
| 6,850,943 B2 * | 2/2005 | Teixeira et al. ...................... 1/1 | |
| 6,976,259 B1 | 12/2005 | Dutta et al. | |
| 7,035,912 B2 | 4/2006 | Arteaga | |
| 7,051,366 B1 | 5/2006 | LaMacchia et al. | |
| 7,131,143 B1 | 10/2006 | LaMacchia et al. | |
| 7,373,646 B1 | 5/2008 | Smith | |
| 7,454,791 B1 * | 11/2008 | Godwin .......................... 726/25 |
| 7,546,629 B2 * | 6/2009 | Albert et al. ...................... 726/1 |
| 7,660,809 B2 * | 2/2010 | Cortright et al. ........ 707/999.102 |
| 7,698,445 B2 * | 4/2010 | Fitzpatrick et al. ........... 709/229 |

(Continued)

FOREIGN PATENT DOCUMENTS

EP 0853279 B1 9/2006

OTHER PUBLICATIONS

"Java(tm) 2 Platform, Micro Edition Content Handler API Specification (CHAPI)", Jun. 3, 2005, pp. 1-100, vol. 1.0, Sun Microsystems, Inc., Santa Clara, USA.

(Continued)

*Primary Examiner* — Van Nguyen
(74) *Attorney, Agent, or Firm* — Bereskin & Parr LLP/S.E.N.C.R.L., s.r.l.

(57) ABSTRACT

A communication device has memory for storing a client application module, a server application module, and an operating system module which are executable by one or more processors. The client application module submits a request and, in response, the server application module causes the request to be processed with use of the operating system module. An interface module causes one or more client process handles of a client stack of the client application module to be provided in a current process base of the operating system module. Thus, for the request, the operating system module checks one or more permission settings associated with the one or more client process handles as well as one or more permission settings associated with the one or more server process handles.

22 Claims, 7 Drawing Sheets

U.S. PATENT DOCUMENTS

| | | | |
|---|---|---|---|
| 2001/0011341 A1 | 8/2001 | Hayes, Jr. et al. | |
| 2003/0149646 A1* | 8/2003 | Chen et al. | 705/35 |
| 2003/0163403 A1* | 8/2003 | Chen et al. | 705/36 |
| 2003/0191703 A1* | 10/2003 | Chen et al. | 705/36 |
| 2004/0078591 A1* | 4/2004 | Teixeira et al. | 713/201 |
| 2004/0260948 A1* | 12/2004 | Miyata et al. | 713/201 |
| 2006/0031681 A1* | 2/2006 | Smith et al. | 713/182 |
| 2006/0160529 A1* | 7/2006 | Glass | 455/418 |
| 2007/0094499 A1* | 4/2007 | Dokuni | 713/168 |
| 2007/0233794 A1 | 10/2007 | Singh | |
| 2008/0040774 A1* | 2/2008 | Wang et al. | 726/1 |
| 2008/0046961 A1 | 2/2008 | Pouliot | |
| 2008/0077997 A1* | 3/2008 | Miyata et al. | 726/28 |
| 2010/0088195 A1 | 4/2010 | Bellamy et al. | |

OTHER PUBLICATIONS

"JSR 211: Content Handler API", Java Community Process(SM) Program, Jul. 7, 2008, pp. 1-5, Sun Microsystems.

"Currency Server Security Analysis", www.currencysystem.com, Sep. 17, 2010, pp. 1-5, www.currencysystem.com/wp/security/.

"Overview of the BEA Tuxedo CORBA Environment", www.oracle.com, Sep. 17, 2010, pp. 1-15, www.download.oracle.com/docs/cd/E13203 01/tuxedo/tux81/getstart/overview.htm.

Office Action. Canadian Application No. 2,639,050. Dated: Feb. 17, 2012.

* cited by examiner

METHODS AND APPARATUS FOR MAINTAINING PERMISSIONS FOR CLIENT/SERVER PROCESSING IN A COMMUNICATION DEVICE

BACKGROUND

1. Field of the Technology

The present disclosure relates generally to communication devices, especially mobile communication devices operative in wireless communication networks, which are adapted to utilize client/server application modules as well as to maintain permissions for such modules.

2. Description of the Related Art

A mobile communication device may operate in a wireless communication network which provides for high-speed packet data communications. Such mobile device may offer a number of different capabilities or features for a user. Many of these capabilities are defined by the primary application modules which are installed in the mobile device. The mobile device may have a voice telephony application, a data or message synchronization application (e.g. for e-mail messages or calendar items), a Web browser or Internet search application, or combinations thereof, as examples. The application modules typically interact with an operating system (OS) module of the mobile device for processing.

In addition to the primary application modules, third-party or secondary application modules may be installed in the mobile device to obtain secondary features. Developers may design "client" application modules and "server" application modules in accordance with a predetermined application programming interface (API) protocol, which facilitates efficient design modularity and compatibility for third-party development.

BRIEF DESCRIPTION OF THE DRAWINGS

Embodiments of the present disclosure will now be described by way of example with reference to attached figures, wherein.

DETAILED DESCRIPTION OF THE DRAWINGS

According to the present disclosure, a communication device has memory for storing a client application module, a server application module, and an operating system module which are executable by one or more processors. The client application module submits a request and, in response, the server application module causes the request to be processed with use of the operating system module. Prior to processing, an interface module causes one or more client process handles of a client stack of the client application module to be provided in a current process base of the operating system module. Thus, for the request, the operating system module checks one or more permission settings associated with the one or more client process handles as well as one or more permission settings associated with the one or more server process handles. The operating system module allows the request to be processed if the one or more permission settings associated with the one or more client process handles and the one or more permission settings associated with the one or more server process handles indicate that permission is granted, but otherwise denies the processing of the request if any one of the permission settings associated with the one or more client process handles and the one or more server process handles indicate that permission is denied. Advantageously, the inventive approach facilitates client/server modularity where permission settings of the client are properly inherited by the server, without requiring modifications to the communication protocol established between the client and the server.

Figure 1:
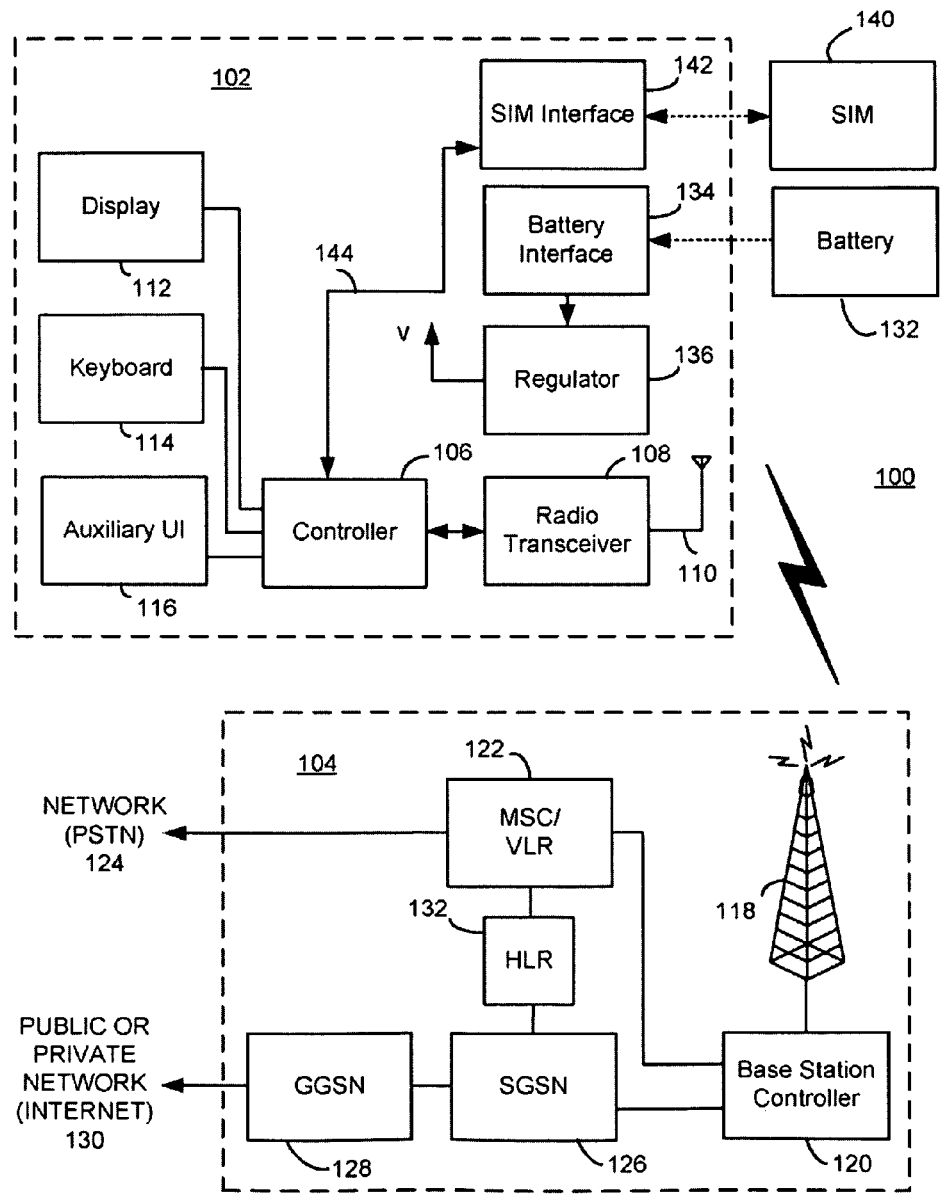
FIG. 1 is a block diagram which illustrates pertinent components of a mobile station and a wireless communication network within which the mobile station may operate.

To illustrate exemplary system archtecture, FIG. 1 shows a block diagram of a communication system 100 which includes a mobile station 102 (one example of a communication device, or wireless mobile communication device) which communicates through a wireless communication network 104. Mobile station 102 may include a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system module software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a tower station 118 and a base station controller (BSC) 120 (described later below), including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 may include a battery interface 134 for receiving one or more rechargeable batteries 138. Battery 138 electrical power to electrical circuitry in mobile station 102, and battery interface 134 provides for a mechanical and electrical connection for battery 132. Battery interface 134 is coupled to a regulator 136 which regulates power to the device. Mobile station 102 may be a handheld portable communication device, which includes a housing (e.g. a plastic housing) which carries and contains the electrical components of mobile station 102 including battery 138. Mobile station 102 may operate using a Subscriber Identity Module (SIM) 140 or an equivalent module which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal may not be fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. As mentioned earlier, mobile station 102 may be a handheld portable communication device which includes a housing (e.g. a plastic housing) which carries and contains the electrical components of mobile station 102. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. Wireless communication network 104 may comprise a cellular telecommunications network. In the embodiment of FIG. 1, wireless network 104 is configured in accordance with General Packet Radio Service (GPRS) and a Global Systems for Mobile (GSM) technologies. Today, such a mobile station may further operate in accordance with Enhanced Data rates for GSM Evolution (EDGE) or Enhanced GPRS (EGPRS). In such environment, wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on algorithms, keys, and criteria (e.g. as in existing GSM). In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Note that wireless network 104 may be based on any other suitable network technology or network, such as a Long-Term Evolution (LTE)-based network, an EVolution-Data Only (EV-DO)-based network, a UMTS-based network, or High Speed Packet Access (HSPA). Alternatively, wireless network 104 may be a wireless local area network (i.e. IEEE 802.11), a Bluetooth-based network, a WiMAX-based network (i.e. IEEE 802.16), or a Ultra-WideBand (UWB)-based network (i.e. IEEE 802.15), as a few examples.

Figure 2:
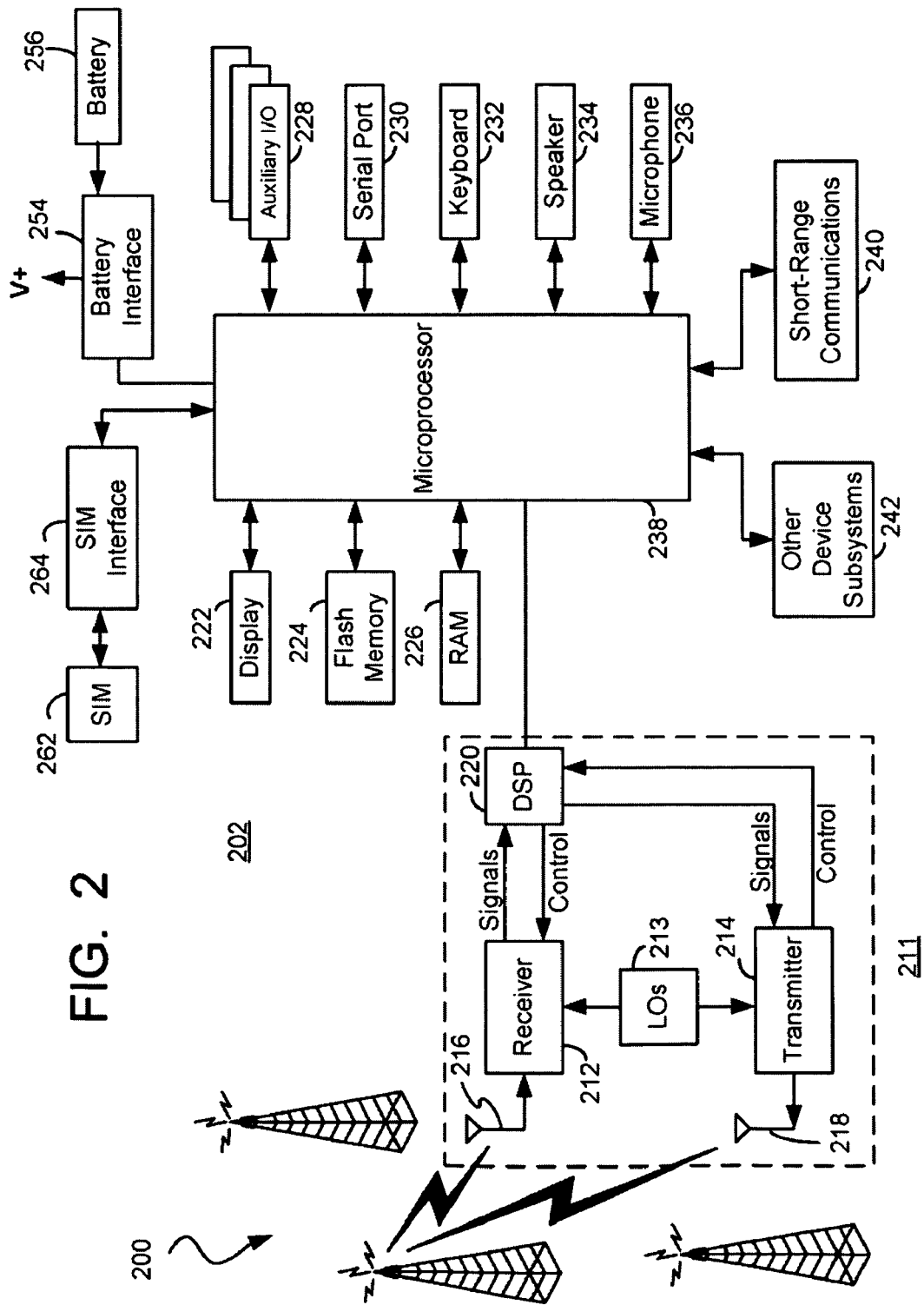
FIG. 2 is a more detailed diagram of the mobile station of FIG. 1 in accordance with one embodiment.

FIG. 2 is a detailed block diagram of an exemplary mobile station 202 in accordance with one embodiment of the present disclosure. Mobile station 202 may be a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access may be associated with a subscriber or user of mobile station 202, and therefore mobile station 202 may require a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. The communication techniques of the present disclosure may generally be controlled by microprocessor 238 in connection with DSP 220. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system module used by microprocessor 238 may be stored in a persistent store such as flash memory 224, which may alternatively be a read-only memory (ROM) or similar storage element (not shown). Those skilled in the art will appreciate that the operating system module, specific device applications, or parts thereof, may be temporarily loaded into a volatile store such as RAM 226.

Microprocessor 238, in addition to its operating system module functions, enables execution of software applications on mobile station 202. A predetermined set of applications which control basic device operations, including at least data and voice communication applications, will normally be installed on mobile station 202 during its manufacture. One application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information. The PIM application has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 may comprise a complete alphanumeric keyboard and/or telephone-type keypad. These composed items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component which provides for communication between mobile station 202 and different systems or devices, which need not necessarily be similar devices.

Figure 3:
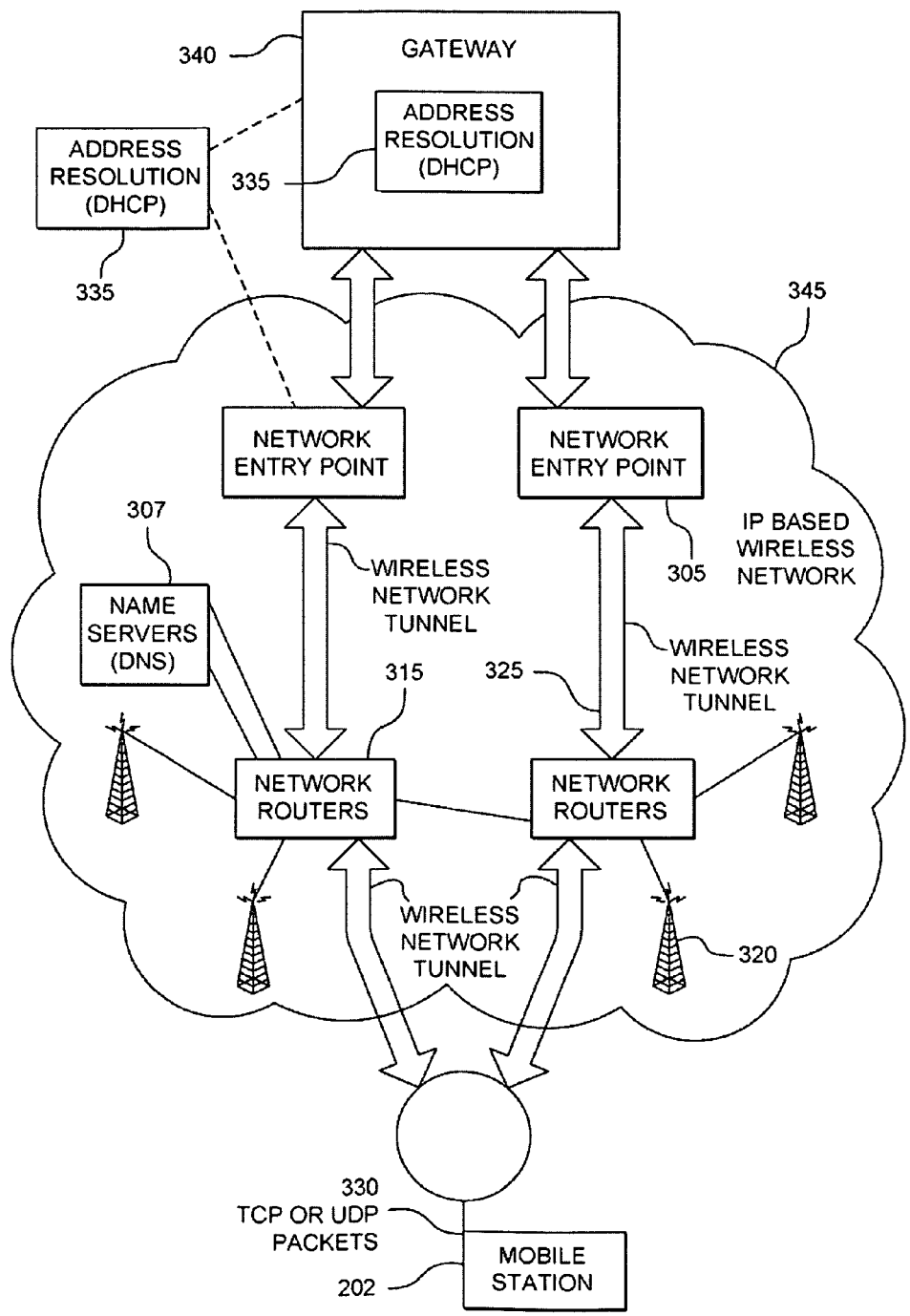
FIG. 3 is a particular system architecture for the wireless network of FIGS. 1 and 2 for packet data communication.

FIG. 3 shows a particular system structure for packet data communications which may be utilized in connection with application modules of mobile station 202. In particular, FIG. 3 shows basic components of an IP-based wireless data network which may be utilized for high-speed and "pushed" data communications. Mobile station 202 communicates with a wireless packet data network 345, and may also be capable of communicating with a wireless voice network (not shown).

As shown in FIG. 3, a gateway 340 may be coupled to an internal or external address resolution component 335 and one or more network entry points 305. Data packets are transmitted from gateway 340, which is source of information to be transmitted to mobile station 202, through network 345 by setting up a wireless network tunnel 325 from gateway 340 to mobile station 202. In order to create this wireless tunnel 325, a unique network address is associated with mobile station 202. In an IP-based wireless network, however, network addresses are typically not permanently assigned to a particular mobile station 202 but instead are dynamically allocated on an as-needed basis. It is thus typical for mobile station 202 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile station 202.

Wireless network tunnels such as a wireless tunnel 325 are opened across wireless network 345 in order to allocate necessary memory, routing, and address resources to deliver IP packets. Such tunnels 325 are activated as part of what are referred to as Packet Data Protocol or "PDP contexts" (i.e. packet data sessions). To open wireless tunnel 325, mobile station 100 must use a specific technique associated with wireless network 345. The step of opening such a wireless tunnel 325 may require mobile station 202 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 202 and communicated to gateway 340, information can then be forwarded from gateway 340 to mobile station 202.

Figure 4:
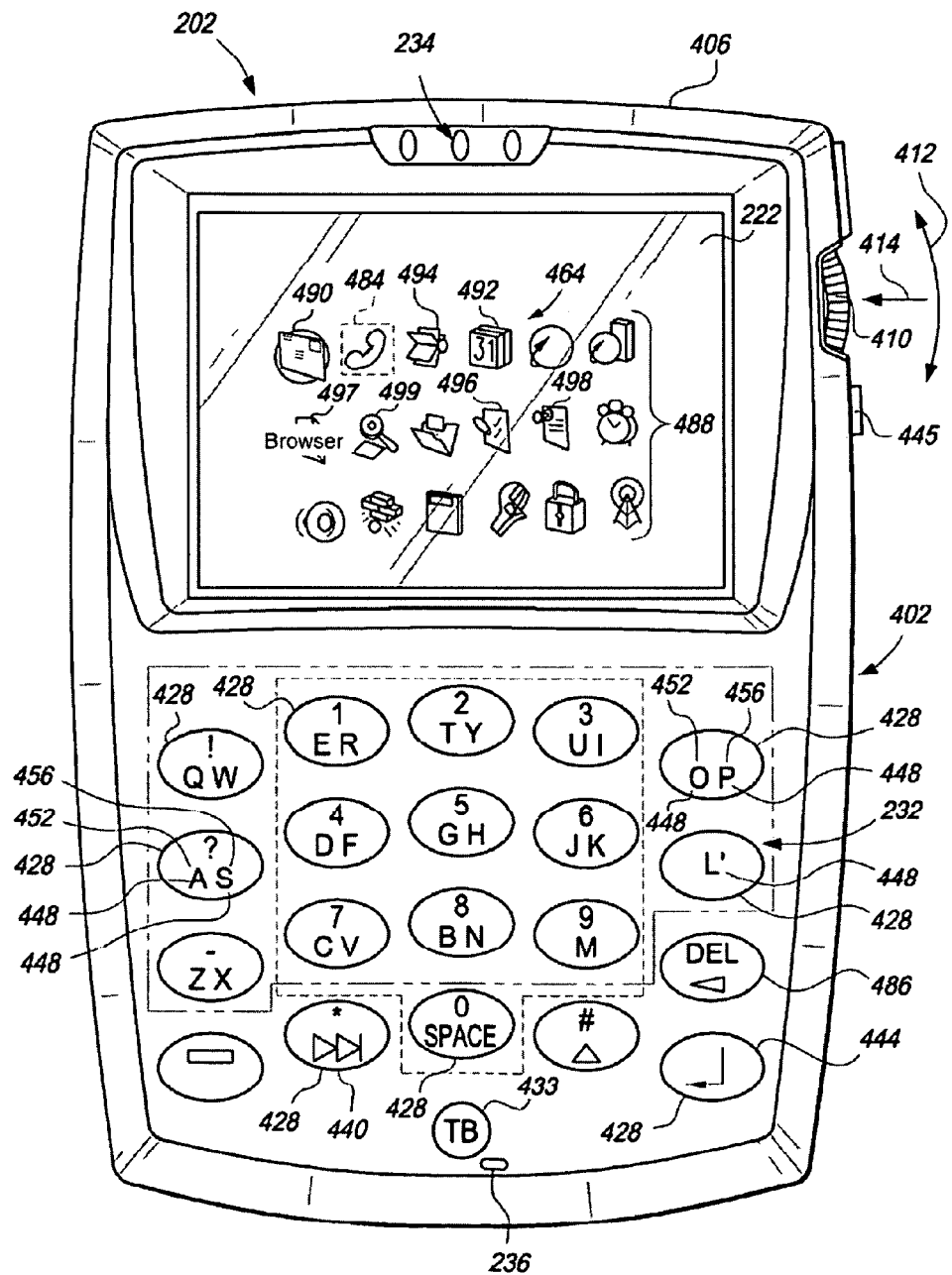
FIG. 4 is an illustrative example of an exemplary user interface of the mobile station of FIGS. 1 and 2, in accordance with one embodiment, depicted as a handheld mobile telephony and/or messaging device, and which provides a plurality of features through various application modules stored in the mobile station.

Referring now to FIG. 4, what is shown is an illustrative representation of an exemplary user interface 402 of mobile station 202 of FIGS. 1 and 2 which includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile station 202 may be sized to be a handheld portable device. As an alternative to or in addition to positioning wheel 410 and/or trackball 433, a wide range of one or more pointing or cursor/view positioning mechanisms such as a touch pad, a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. In some embodiments, keyboard 232 may comprise a physical keyboard or a virtual keyboard (which may utilize a touchscreen) or both. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor. Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86) depicted as corresponding discrete icons 488. Icons 488 include, for example, an Electronic Mail (E-Mail) icon 490, a Calendar icon 492, an Address Book icon 494, a Tasks icon 496, a Web browser/search icon 497, a MemoPad icon 498, and a Local Device Search icon 499, respectively.

Figure 5:
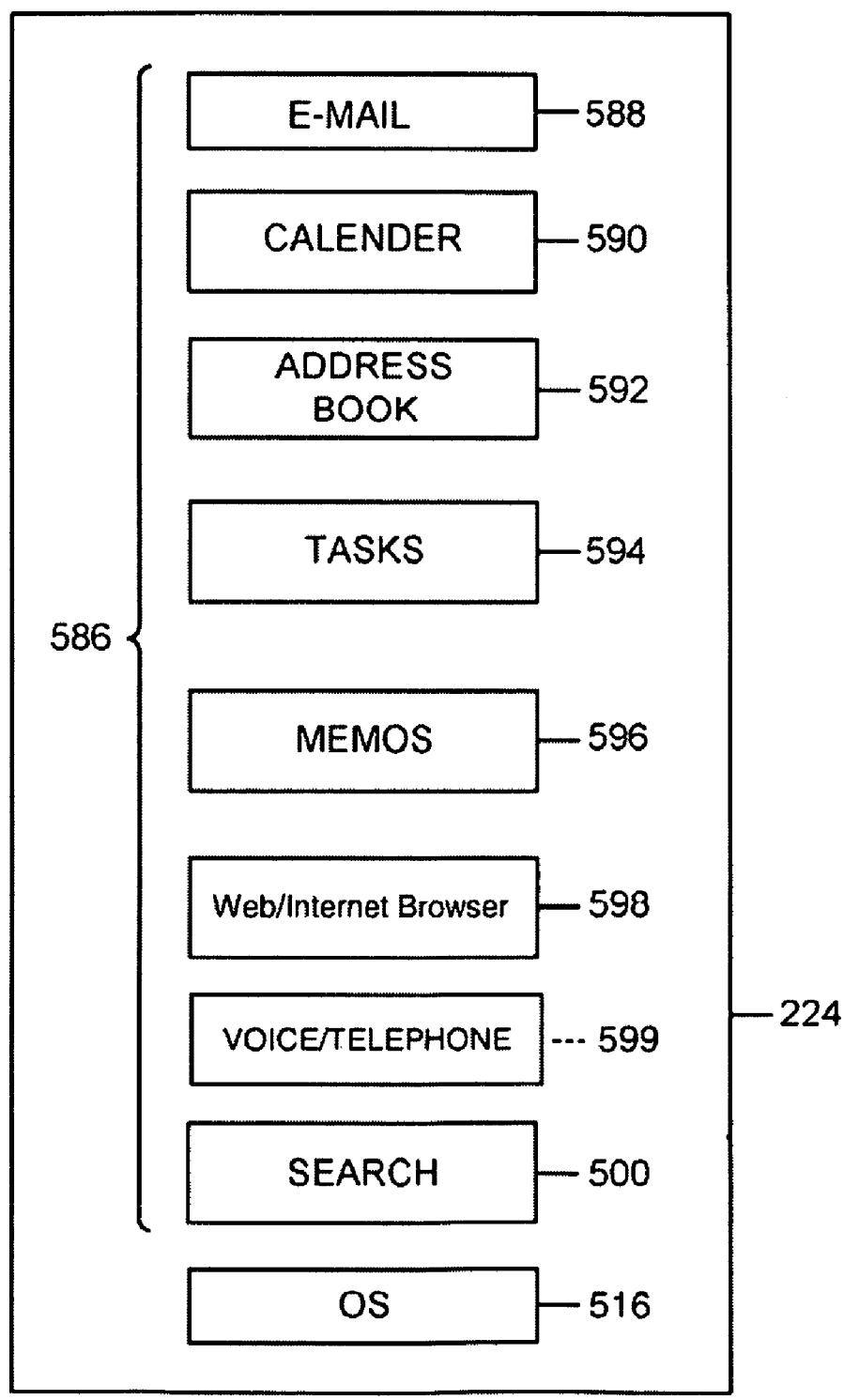
FIG. 5 is an illustrative representation of memory of the mobile station which has a plurality of applications modules stored therein.

As shown further in FIG. 5, memory 224 of mobile station 202 includes a plurality of application modules or routines 586 associated with the visually displayed icons 488 of FIG. 4 for the processing of data. Application modules 586 may be in any of a variety of forms such as, without limitation, software, firmware, and the like. Application modules 586 may include, for example, an Electronic Mail (E-Mail) application module 588 (FIG. 5) associated with E-mail icon 490 (FIG. 4), a Calendar application module 590 (FIG. 5) associated with Calendar icon 492 (FIG. 4), an Address Book application module 592 (FIG. 5) associated with Address Book icon 494 (FIG. 4), a Tasks application module 594 (FIG. 5) associated with Tasks icon 496 (FIG. 4), a MemoPad (Memos) application module 596 (FIG. 5) associated with MemoPad icon 498, a Web Browser application module 598 (FIG. 5) associated with Web Browser icon 497 (FIG. 4), a Voice Telephony application module 599 (FIG. 5) associated with Voice/Telephone icon 484, and a Local Device Search application module 500 (FIG. 5) associated with Local Device Search icon 499 (FIG. 4). An operating system (OS) module 516 also resides in memory 224.

In FIG. 4, the "home" screen output is shown as currently active and constitutes the main "ribbon" application for displaying the icons 488 shown. An application module, such as E-mail application module 588 of FIG. 5, may then be initiated (opened or viewed) from user interface 402 by providing a suitable user input to it. For example, E-mail application module 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application module 500 and accepts input from positioning wheel 410 to initiate a search from that icon 499. Application modules 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile station 202 has just been described, any suitable mobile communication device or terminal may be part of the inventive methods and apparatus which will be described in fuller detail below. Note that various components of mobile device 202 shown and described may not be needed nor included (e.g. a full QWERTY keypad may be optional).

Mobile station 202 may offer a number of different capabilities or features for a user, many of which are defined by the "primary" application modules which are installed therein. These application modules typically interact with OS module 516 of the mobile device for processing. In addition to the "primary" application modules, "third-party" or "secondary" application modules may be installed in mobile station 202 to obtain secondary features. Developers may design "client" application modules and "server" application modules in accordance with a predetermined application programming interface (API) protocol, which facilitates efficient design modularity and compatibility for third-party development. It has been identified, however, that the security context or permission rights of such application modules may not be properly maintained in this type of environment.

Figure 6:
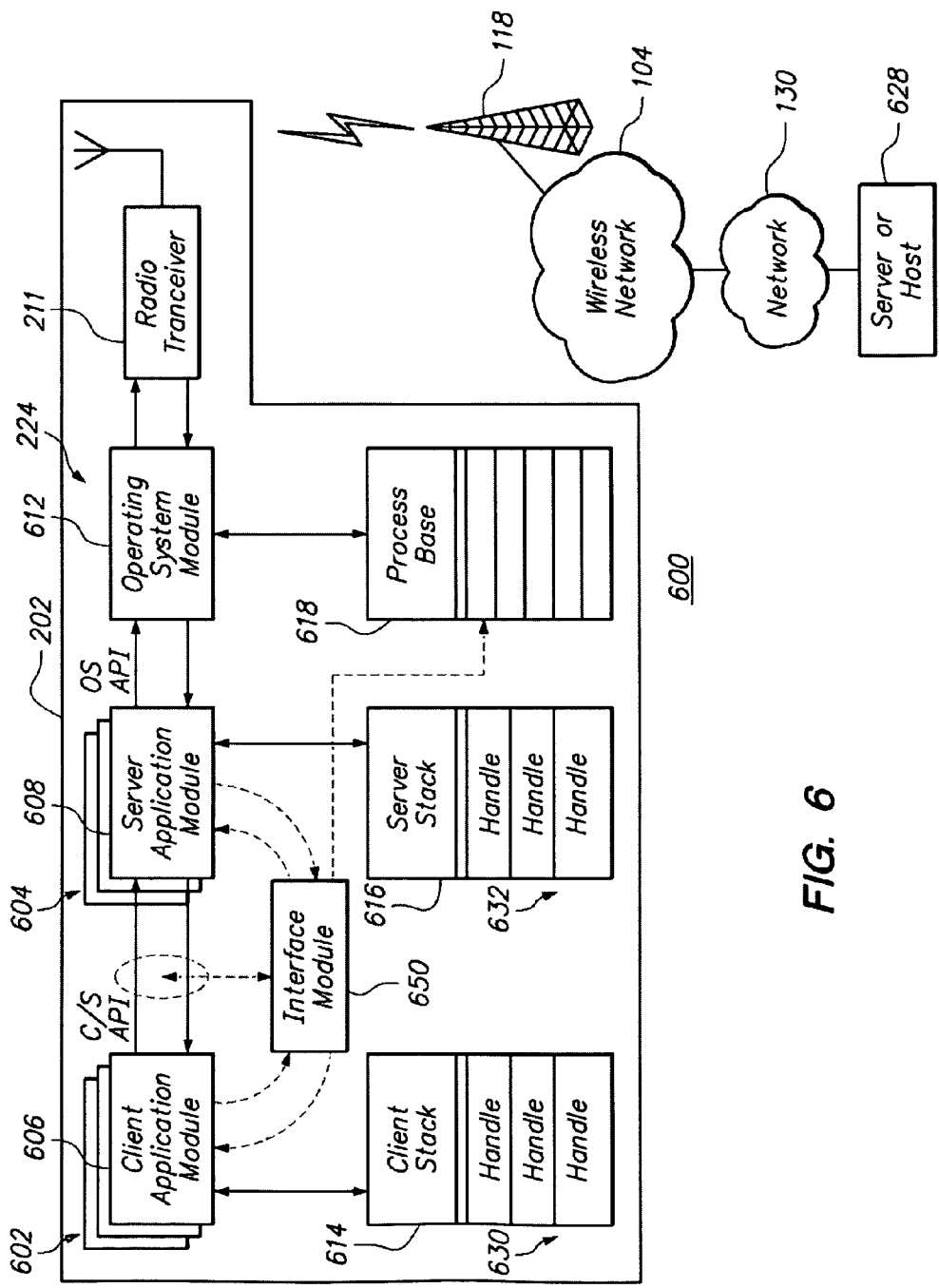
FIG. 6 is an illustrative representation of the various application modules stored in the memory as well as an interface module which is used for properly maintaining client/server permissions.

FIG. 6 is an illustrative representation of the portions of mobile station 202 that are more pertinent in describing how permissions may be properly maintained in mobile station 202 for client/server processing. The techniques of the present disclosure are described later in more detail in relation to the process flow diagram of FIG. 7. In FIG. 6, it is show that mobile station 202 has a plurality of client application modules 602 (such as a client application module 606), a plurality of server application modules 608 (such as a server application module 608), and an operating system (OS) module 612. All such modules are installed, stored, or otherwise provided in memory 224 and contained therein. Although techniques of the present disclosure may be described in relation to client application module 606 and server application module 608, the techniques may indeed apply to other client and server application modules in mobile station 202 as well.

During processing, client application module 602 communicates with one or more server application modules 608, such as server application module 608, through use of a predetermined client/server (C/S) application programming interface (API) protocol. Client application module 602 submits one or more requests to be processed by server application module 608. In response, server application module 608 attempts to process such requests and submit responses to client application module 602. These requests and responses are communicated in accordance with the predetermined client/server API protocol. In one embodiment, the predetermined client/server API protocol is defined by the Java Specification Request (JSR) 211 standard and associated with the Content Handler API (CHAPI), the client and server application modules 602 and 608 being adapted to communicate in accordance with the same.

In processing such requests, server application module 608 communicates with operating system module 612 through use of a predetermined OS API protocol. In response to a request from client application module 606, server application module 608 submits one or more requests to be processed by operating system module 612. In response to requests from server application module 608, operating system module 612 attempts to process such requests and submits corresponding responses to server application module 608. These requests and responses are communicated in accordance with the predetermined OS API protocol. If and where needed, operating system module 612 may communicate or facilitate communication with a remote server or host 628, through the radio transceiver 211 of mobile station 202, via base station 118 (or access point) of wireless communication network 104 via another network 130 (e.g. the Internet).

At least some of client and server application modules 602 and 608 may be third-party or secondary application modules of mobile station 202, which may be added on or installed in mobile station 202 as secondary applications or features. In contrast, other application modules of mobile station 202 may be primary application modules which were installed or otherwise provided initially in mobile station 202. In one embodiment, the primary application modules of mobile station 202 include e-mail application modules, calendaring/scheduling application modules, voice telephony application modules, address book/contact list application modules, or combinations of the above. See e.g. the description in relation to FIGS. 4 and 5. Primary application modules of mobile station 202 may interface directly with operating system module 612 (without interfacing with server application modules) with use of the predetermined OS API protocol.

Illustrating application modules of the third-party or secondary type, client application module 606 may be a map rendering application module and server application module 608 may be a GPS application module. As another example, client application module 606 may be a communications application module, such as a contact list or address book synchronization application module, and server application module 608 may be an address book or contact list application module. As yet another example, client application module 606 may be or include a display application module for graphics, pictures, or video (e.g. a browser application module), where server application module 608 is a specific (e.g. proprietary) graphics, picture, or video rendering application module, and the request is or includes a request for the graphics, picture, or video to be rendered within the display application module.

At least some of the modules 606 and 608 are associated with permission settings which indicate whether permission for use or access of another module, information, or service is authorized for the module or process. Each module may have one or more permission settings which may be stored in memory of mobile station 202. The permission settings may be programmable or configurable by a user of mobile station or an administrator thereof, which may be received via a user interface of mobile station 202, or received through a communication interface (radio or wired connection such as USB) of mobile station 202 from an application residing on another computer.

One of the client application modules 606 may be an application module which is associated with a permission setting indicating whether access to a network (e.g. the Internet) is allowed, or which locations or sites are allowed or denied. Another one of the client application modules 606 may be a communications application module, such as a contact list or address book synchronization application module, which is associated with a permission setting indicating whether access to address book or user contact information in a contact list or address book application module is allowed. Further, another one of the client application modules 606 may be a map rendering application module, which is associated with a permission setting indicating whether access to a global positioning system (GPS) service or a network map server or database is allowed.

During processing, client application module 606 is associated with and utilizes a client stack 614 which includes a plurality of client process handles 630. Client process handles 630 are identifiers of current client modules or processes utilized by client application module 606 for processing. Each client process handle 630 is associated with the one or more permission settings in memory. Similarly, server application module 608 is associated with and utilizes a server stack 616 which includes a plurality of server process handles 632. Server process handles 632 are identifiers of current server modules or processes utilized by server application module 608 for processing. Each server process handle 632 is associated with one or more permission settings in memory. On the other hand, operating system module 612 is associated with and utilizes a process base 618 during processing. Process base 618 has information needed by operation system module 612 for properly processing requests, including the security context utilized for security or permission checks.

An interface module 650 is provided to facilitate processing of requests between client and server application modules, and maintain proper permissions for such client/server processing. Interface module 650 is designed and stored separate and apart from any client and server application module, and does not affect or require any modifications to the client/server API protocol. To facilitate proper permissions checks, interface module 650 is adapted to cause client process handles 630 in client stack 614 to be provided in process base 618 of operating system 612 in response to identifying a request from a client application module. Such processing is described in more detail below in relation to FIG. 7.

Figure 7:
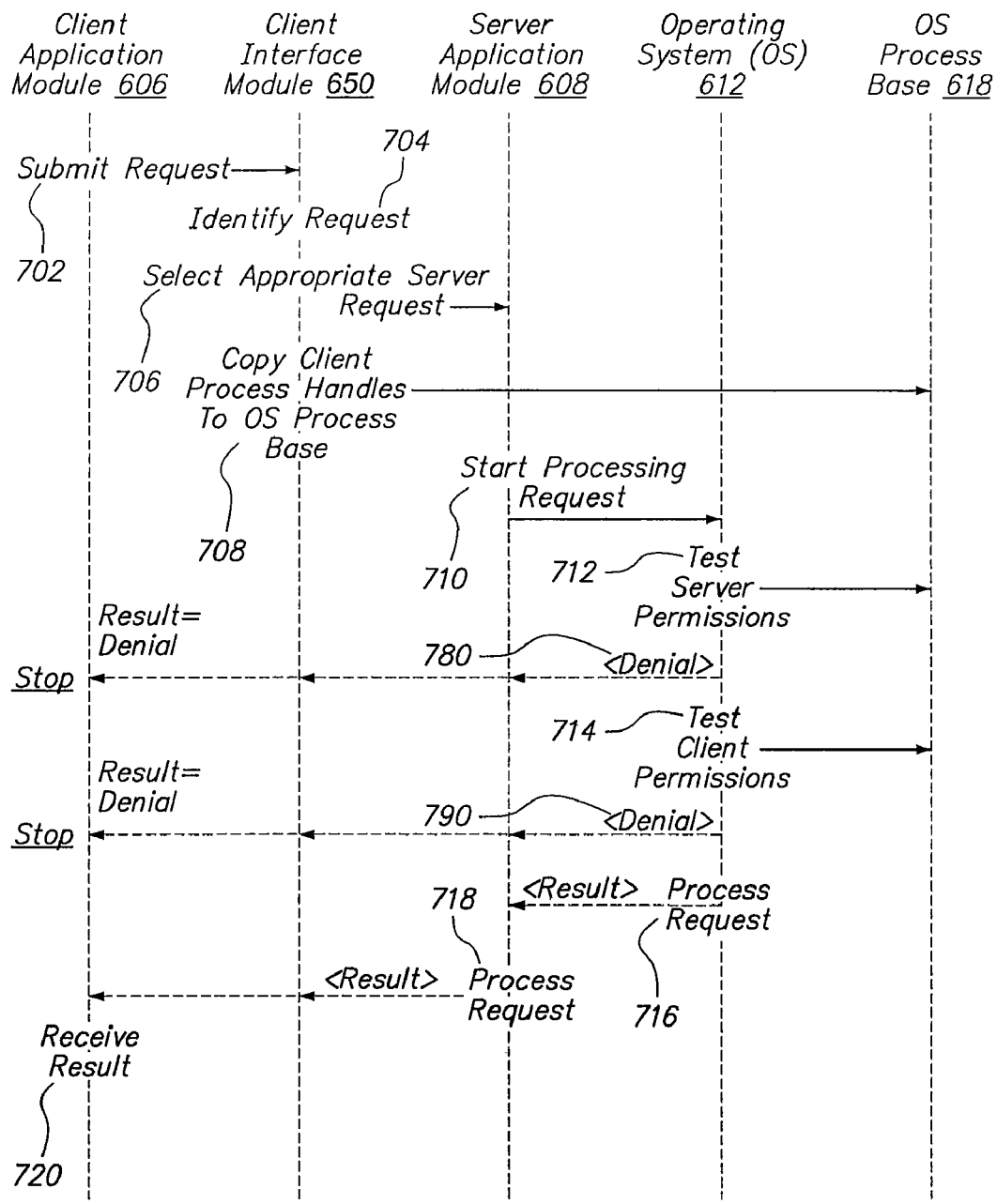
FIG. 7 is a process flow diagram for a method for use in maintaining permissions for client/server processing in a communication device such as the mobile station of FIGS. 1-6.

FIG. 7 is a process flow diagram which outlines a method for use in maintaining permissions for client/server processing in a communication device. The method of FIG. 7 will be described with reference to the modules/components of FIG. 6. This method is especially useful when at least some client and server application modules, which may be third-party or secondary application modules, have been designed in accordance with a predetermined communication protocol therebetween. These client and server application modules may have been installed after the installation of primary application modules, after sale of the communication device. Such technique may overcome the prior art or other related deficiencies in these and other environments or contexts.

The method of FIG. 7 may be performed by a suitable communication device or terminal, including mobile station 102/202 described in relation to FIGS. 1-4. In particular, the techniques described in relation to the flowchart may be performed by one or more processors (controller, processor, microprocessor, etc.) of a communication device. A computer program product which may embody the technique may include a computer readable medium having computer instructions stored therein which are executable by the one or more processors for performing the technique.

The method begins at step 702 of FIG. 7, where client application module 606 submits a request for a function to be performed. Interface module 612 identifies this request (step 704 of FIG. 7) and selects an appropriate one of the server application modules to service the request (step 706 of FIG. 7). In this example, the request is received and serviced by server application module 608 to perform the function. The communication and processing of requests may be performed in accordance with a predetermined client/server API protocol (e.g. the JSR 211 standard which is associated with the CHAPI).

Client application module 606 may be a map rendering application module and server application module 608 may be a GPS application module, where the request is or includes a request for map data (e.g. image or vector-based map data) at a specified location (e.g. a current location of the communication device which is obtained through use of GPS). As another example, client application module 606 may be a communications application module, such as a contact list or address book synchronization application module, and server application module 608 may be an address book or contact list application module, where the request is or includes a request for synchronizing contact list or address book data with a corresponding application at a remote server on a network such as the Internet. As even another example, client application module 606 may be or include a display application module for graphics, pictures, or video (e.g. a browser application module), where server application module 608 is a specific (e.g. proprietary) graphics, picture, or video rendering application module, and the request is or includes a request for the graphics, picture, or video to be rendered within the display application module.

Operating system module 612 will be processing one or more requests received from server application module 608 which are submitted in order to facilitate processing of the original request from client application module 606. Since operating system module 612 will be processing one or more requests received from server application module 608, the security context of server application module 608 is provided or made available to operating system module 612. Specifically, server process handles 632 of server stack 616 are provided in process base 618 of operating system module 612. This is done so that the security context or permission settings associated with the server are checked for request processing.

In response to identifying the request from client application module 606, interface module 612 causes the security context of client application module that originated the request to be provided or made available to operating system module 612. In particular, interface module 612 identifies the proper client application module from the request (in this case, client application module 606), and causes client process handles 630 of client stack 614 associated with client application module 606 to be provided in process base 618 (step 708 of FIG. 7). Specifically, interface module 612 copies client process handles 630 into process base 618. Thus, both client and server process handles 630 and 632 are made available in process base 618 prior to processing of the one or more requests by operating system module 612, so that the security contexts or permission settings associated with both client and server are checked for request processing.

The security context or permission settings will depend on the application and the implementation of the present techniques. If the application module is the (Web) browser application module or (Web) server application module, for example, it may be associated with a permission setting indicating whether access to the network (e.g. the Internet) is allowed (e.g. whether requests are permitted to be serviced through the network), or which locations or sites are allowed or denied. If the application module is the communications application module, such as the contact list or address book synchronization application module, it may be associated with a permission setting indicating whether access to user contact or address book information in a contact list or address book application module is allowed or denied, or a permission setting indicating whether access to the network (e.g. the Internet or an Intranet) is allowed (e.g. whether requests are permitted to be serviced through the network), or both. If the application module is a map rendering application module, it may be associated with a permission setting indicating whether access a global positioning system (GPS) service or a network map server or database is allowed or denied.

For request processing, server application module 608 communicates with operating system module 612 via the OS API protocol (step 710 of FIG. 7). Operating system module 612 begins processing of the one or more requests submitted from server application module 608 for processing the original request from client application module 606. In processing the request, operating system module 612 examines process base 618 and identifies server process handles 632 therein. As described earlier, each server process handle is associated with one or more permission settings. Operating system module 612 checks or tests the security context of server application module 608 by testing the permission settings associated with each one of server process handles 632 in process base 618 (step 712 of FIG. 7). If any one of the permission settings associated with server process handles 632 indicates that permission is denied, further processing of the request is denied or prohibited, and a denial indication is produced and communicated as the result (step 780 of FIG. 7). Processing of the request is stopped and not completed. The denial indication or a corresponding indication may be communicated to and provided at a user interface of the communication device.

On the other hand, if all of the permission settings associated with server process handles 632 indicate that permission is allowed in step 712, processing of the request continues. Operating system module 612 further examines process base 618 and identifies client process handles 630 therein. As described earlier, each client process handle 630 is associated with one or more permission settings. Operating system module 612 checks or tests the permission settings associated with each one of client process handles 630 in process base 618 (step 714 of FIG. 7). If any one of the permission settings associated with client process handles 630 indicates that permission is denied, processing of the request is denied or prohibited, and a denial indication is produced and communicated as the result (step 790 of FIG. 7). Processing of the request is stopped and not completed. The denial indication or a corresponding indication may be communicated to and provided at a user interface of the communication device. On the other hand, if all of the permission settings associated with client process handles 630 indicate that permission is granted, processing of the request is allowed to continued and indeed continues.

Assuming all permissions are granted, and no other process denials occur, the request is processed and a result is produced and submitted to server application module 608 (step 716 of FIG. 7). The request is further processed by server application module 608 based on the result (step 718 of FIG. 7), producing a new result which is communicated or otherwise provided to client application module 606, which receives it (step 720 of FIG. 7). Again, the communication and processing of requests may be performed in accordance with the predetermined client/server API protocol. The result, or information based on the result, may be output at the user interface of the communication device.

If client application module 606 is a (Web) browser application module, the result may be data for visual displaying information at the communication device. If the application module is the map rendering application module, the result may be map data (e.g. image or vector-based map data) of a location (e.g. a current location of the communication device obtained through use of GPS). If the application module is the communications application module, such as the contact list or address book synchronization application module, the result may be updated address book or contact list information from the corresponding application at the remote server for storing in the memory of the communication device, or a confirmation message that updated address book or contact list information at the communication device has been updated at the corresponding application at the remote server.

Note that the process of FIG. 7 is repeated for each one of a plurality of requests from client application module 606, and interface module 650 may process multiple requests from a plurality of different application modules in a multi-tasked, parallel processing approach.

As apparent, third-party or secondary application modules may be installed in the communication device to obtain secondary features in addition to primary features of the communication device, without compromising security or permissions. Developers may provide client and server application modules which communicate based on the predetermined API protocol, which facilitates efficient design modularity and compatibility for third-party development, and this predetermined API protocol needs not be altered to maintain the proper permissions as described herein. The interface module utilized in the present techniques may be designed and operate separately and independently from such client or server application modules.

Thus, as described herein, a communication device has memory for storing a client application module, a server application module, and an operating system module which are executable by one or more processors. The client application module submits a request and, in response, the server application module causes the request to be processed with use of the operating system module. The communication and processing of requests may be performed in accordance with a predetermined API protocol. Prior to processing, an interface module causes one or more client process handles of a client stack of the client application module to be provided in a current process base of the operating system module. Thus, for the request, the operating system module checks one or more permission settings associated with the one or more client process handles as well as one or more permission settings associated with the one or more server process handles. The operating system module allows the request to be processed if the one or more permission settings associated with the one or more client process handles and the one or more permission settings associated with the one or more server process handles indicate that permission is granted, but otherwise denies the processing of the request if any one of the permission settings associated with the one or more client process handles and the one or more server process handles indicate that permission is denied. Advantageously, the inventive approach facilitates client/server modularity where permission settings of the client are properly inherited by the server, without requiring modifications to the communication protocol established between the client and the server.

The above-described embodiments of the present disclosure are intended to be examples only. For example, one of the client application modules may be a (Web) browser application module, where the server application module may be a Web server application module, and the request is or includes a Hypertext Transfer Protocol (HTTP) request for information at a remote server on a network such as the Internet. Those of skill in the art may effect alterations, modifications and variations to the particular embodiments without departing from the scope of the application. The techniques described and claimed herein intend to embrace suitable future changes in technology.

What is claimed is:

1. A method performed in a communication device, the method comprising the acts of:
   identifying a request from a client application module which is to be processed by a server application module through use of an operating system module on the communication device; and
   in response to identifying the request:
      causing one or more client process handles of a client stack of the client application module to be provided in a current process base of the operating system module which includes one or more server process handles of a server stack of the server application module, checking one or more permission settings associated with the one or more client process handles and one or more permission settings associated with the one or more server process handles, and denying further processing of the request if any one of the permission settings associated with the one or more client process handles or the one or more server process handles indicates that permission is denied;
   wherein the one or more client process handles identify current client modules or processes utilized by the client application module for processing, and
   the one or more server process handles identify current server modules or processes utilized by the server application module for processing.

2. The method of claim 1, wherein a denial indication is provided for output at a user interface of the communication device if the request is denied further processing.

3. The method of claim 1, further comprising:
   allowing the request to be processed if each permission setting associated with the one or more client process handles and the one or more server process handles indicates that permission is granted.

4. The method of claim 1, further comprising:
   allowing a result of the request to be provided for output at a user interface of the communication device.

5. The method of claim 1, wherein the client application module comprises one of:
   a Web browser application, which is associated with a permission setting indicating whether access to the Internet is allowed;
   a communications application, which is associated with a permission setting indicating whether access to user contact information is allowed; or
   a map rendering application, which is associated with a permission setting indicating whether access to a global positioning system (GPS) service is allowed.

6. The method of claim 1, wherein the method is performed by an interface module of the communication device which is separate and apart from the client application module and which is separate and apart from the server application module.

7. The method of claim 1, further comprising:
   repeating the acts of identifying, causing, checking, and denying, for each one of a plurality of requests from the client application module.

8. The method of claim 1, further comprising:
   receiving, via an interface of the communication device, the permission settings; and
   saving the permission settings in memory of the communication device.

9. The method of claim 1, wherein a primary application module submits requests directly to the operating system module, and wherein the client application module comprises a third-party application of the communication device.

10. The method of claim 1, wherein a protocol for the request between the client application module and the server application module is performed in accordance with a JSR 211 standard.

11. The method of claim 1, wherein the method is performed by computer instructions stored in a physical computer readable medium and executable by a processor of the communication device.

12. A communication device, comprising:
   one or more processors;
   a wireless transceiver coupled to the one or more processors and being operative for communications in a wireless communication network;
   a user interface coupled to the one or more processors;
   memory for storing a client application module, a server application module, and an operating system module;
   the one or more processors being operative to:
   identify a request from the client application module which is to be processed by the server application module through use of the operating system module; and
   in response to identifying the request:
      cause one or more client process handles of a client stack of the client application module to be provided in a current process base of the operating system module which includes one or more server process handles of a server stack of the server application module, check one or more permission settings associated with the one or more client process handles and one or more permission settings associated with the one or more server process handles, and deny further processing of the request if any one of the permission settings associated with the one or more client process handles or the one or more server process handles indicates that permission is denied;
   wherein the one or more client process handles of the client stack identify current client modules or processes utilized by the client application module for processing, and the one or more server process handles of the server stack identify current server modules or processes utilized by the server application module for processing.

13. The communication device of claim 12, wherein the one or more processors are operative to provide a denial indication for output at the user interface if the request is prohibited from further processing.

14. The communication device of claim 12, wherein the client application module comprises one of:
   a Web browser application, which is associated with a permission setting indicating whether access to the Internet is allowed;
   a communications application, which is associated with a permission setting indicating whether access to user contact information is allowed; or
   a map rendering application, which is associated with a permission setting indicating whether access to a global positioning system (GPS) service is allowed.

15. The communication device of claim 12, wherein the protocol for processing the request by the client and the server application modules is performed in accordance with a JSR 211 standard.

16. A method performed in a communication device, the method comprising the acts of:
   submitting, by a client application module, a request;
   causing, by an interface module in response to the request, one or more client process handles of a client stack of the client application module to be provided in a current process base of an operating system module on the communication device;

causing, by a server application module, the request to be processed with use of the operating system module, the one or more server process handles identifying current server modules or processes utilized by the server application module for processing;

checking, by the operating system module for the request, one or more permission settings associated with one or more server process handles in the current process base, the one or more client process handles identifying current client modules or processes utilized by the client application module for processing;

checking, by the operating system module for the request, one or more permission settings associated with the one or more client process handles in the current process base;

allowing, by the operating system module, the request to be processed if the one or more permission settings associated with the one or more client process handles and the one or more permission setting associated with the one or more server process handles indicate that permission is granted;

prohibiting, by the operating system module, further processing of the request if any one of the permission settings associated with the one or more client process handles and the one or more server process handles indicates that permission is denied; and providing a result for the request for output at a user interface of the communication device.

17. The method of claim 16, further comprising:
repeating the acts for each one of a plurality of requests from the client application.

18. The method of claim 17, comprising the further acts of:
receiving, via the user interface, the permission settings and saving the permission settings in memory of the communication device.

19. A communication device, comprising:
one or more processors;
a wireless transceiver coupled to the one or more processors and being operative for communications in a wireless communication network;
a user interface coupled to the one or more processors;
a memory configured to store a client application module, a server application module, an operating system module, and an interface module which are executable by the one or more processors; the client application module configured to submit a request;
the interface module configured to cause, in response to the request, one or more client process handles of a client stack of the client application module to be provided in a current process base of the operating system module;
the server application module configured to cause the request to be processed with use of the operating system module;
the operating system module configured to check, for the request, one or more permission settings associated with the one or more server process handles in the process base, the one or more server process handles identifying current server modules or processes utilized by the server application module for processing;
the operating system module configured to check, for the request, one or more permission settings associated with the one or more client process handles in the process base, the one or more client process handles identifying current client modules or processes utilized by the client application module for processing;
the operating system module configured to allow the request to be processed if the one or more permission settings associated with the one or more client process handles and the one or more server process handles indicate that permission is granted;
the operating system module configured to prohibit further processing of the request if any one of the permission settings associated with the one or more client process handles and the one or more server process handles indicates that permission is denied; and
the client application module configured to provide a result for the request for output at the user interface.

20. The communication device of claim 19, wherein the result comprises one of a process result when the request is allowed to process and a denial indication when processing of the request is inhibited.

21. The communication device of claim 19, wherein the client application module comprises one of:
a Web browser application, which is associated with a permission setting indicating whether access to the Internet is allowed;
a communications application, which is associated with a permission setting indicating whether access to user contact information is allowed; or
a map rendering application, which is associated with a permission setting indicating whether access to a global positioning system (GPS) service is allowed.

22. The communication device of claim 19, which comprises a mobile communication device operative in a wireless communication network.

* * * * *